(12) United States Patent
Jauregui Misas et al.

(10) Patent No.: US 10,281,647 B2
(45) Date of Patent: May 7, 2019

(54) OPTICAL WAVEGUIDE

(71) Applicants: Fraunhofer-Gesellschaft zur Forderung der angewandten Forschung e.V., Munich (DE); Friedrich-Schiller-Universitat Jena, Jena (DE)

(72) Inventors: Cesar Jauregui Misas, Jena (DE); Andreas Tunnermann, Weimar (DE); Jens Limpert, Jena (DE); Christian Gaida, Jena (DE)

(73) Assignees: Fraunhofer-Gesellschaft zur Forderung der angewandten Forschung e.V., Munich (DE); Friedrich-Schiller-Universitat Jena, Jena (DE)

( * ) Notice: Subject to any disclaimer, the term of this patent is extended or adjusted under 35 U.S.C. 154(b) by 0 days.

(21) Appl. No.: 15/515,961

(22) PCT Filed: Oct. 1, 2015

(86) PCT No.: PCT/EP2015/072656
§ 371 (c)(1),
(2) Date: Mar. 30, 2017

(87) PCT Pub. No.: WO2016/050898
PCT Pub. Date: Apr. 7, 2016

(65) Prior Publication Data
US 2017/0302047 A1    Oct. 19, 2017

(30) Foreign Application Priority Data

Oct. 1, 2014    (DE) .................. 10 2014 014 315

(51) Int. Cl.
*G02B 6/122* (2006.01)
*F21V 8/00* (2006.01)
(Continued)

(52) U.S. Cl.
CPC .......... *G02B 6/1221* (2013.01); *G02B 6/0011* (2013.01); *G02B 6/4296* (2013.01);
(Continued)

(58) Field of Classification Search
CPC .. G02B 6/4441; G02B 6/4469; G02B 6/4471; G02B 6/4472; G02B 6/0011;
(Continued)

(56) References Cited

U.S. PATENT DOCUMENTS

2002/0024727 A1    2/2002  Wilcox et al.
2003/0048524 A1    3/2003  Chavez-Pirson et al.
(Continued)

OTHER PUBLICATIONS

International Search Report of the International Searching Authority with English Translation issued in the corresponding PCT International Application No. PCT/EP2015/072656, dated Feb. 5, 2016 (7 pages).
(Continued)

*Primary Examiner* — Michael P Mooney
(74) *Attorney, Agent, or Firm* — Raymond R. Ferrera; Adams and Reese LLP

(57) ABSTRACT

The invention relates to an optical waveguide with at least one core region (1) extending along the longitudinal extent of the optical waveguide, and with a first jacket (2) which, viewed in the cross section of the optical waveguide, surrounds the core region (1). The invention further relates to an optical arrangement with such an optical waveguide, and to a method for producing the optical waveguide. The object of the invention is to make available an optical waveguide for high-performance operation, which is improved in relation to the prior art in terms of mode instability. The invention achieves this object by virtue of the fact that the optical waveguide consists of crystalline material at least in the core region (1).

15 Claims, 4 Drawing Sheets

(51) Int. Cl.
  G02B 6/42 (2006.01)
  G02B 27/10 (2006.01)
  H01S 3/16 (2006.01)
  H01S 3/067 (2006.01)
  H01S 3/094 (2006.01)
  H01S 3/23 (2006.01)
  H01S 3/04 (2006.01)
  H01S 3/042 (2006.01)

(52) U.S. Cl.
  CPC .......... *G02B 27/1006* (2013.01); *H01S 3/042* (2013.01); *H01S 3/0405* (2013.01); *H01S 3/06716* (2013.01); *H01S 3/06729* (2013.01); *H01S 3/06733* (2013.01); *H01S 3/06737* (2013.01); *H01S 3/094007* (2013.01); *H01S 3/1643* (2013.01); *H01S 3/2383* (2013.01); *H01S 3/06708* (2013.01)

(58) Field of Classification Search
  CPC .. G02B 6/1221; G02B 6/4246; G02B 6/4296; G02B 27/1006; H01S 3/005; H01S 3/063; H01S 3/06716; H01S 3/06729; H01S 3/06733; H01S 3/06737; H01S 3/0405; H01S 3/042; H01S 3/094007; H01S 3/2383; H01S 3/1643
  USPC ........ 385/100, 102, 109, 134–139, 123–132, 385/141–144; 359/342, 344
  See application file for complete search history.

(56) References Cited

U.S. PATENT DOCUMENTS

| | | |
|---|---|---|
| 2009/0245295 A1 | 10/2009 | Ishaaya |
| 2012/0069428 A1 | 3/2012 | Limpert et al. |
| 2013/0235448 A1* | 9/2013 | Klenke ................ H01S 3/0057 359/341.1 |
| 2014/0010246 A1 | 1/2014 | Jauregui Misas et al. |

OTHER PUBLICATIONS

Written Opinion of the International Search Authority (Form PCT/ISA/237) with English Translation issued in the corresponding PCT International Application No. PCT/EP2015/072656, dated Feb. 5, 2016 (11 pages).

International Preliminary Report on Patentability Chapter I issued in the corresponding PCT International Application No. PCT/EP2015/072656, dated Apr. 4, 2017 (7 pages).

Xiaodong Mu, Stephanie Meissner, Helmuth Meissner, Anthony W. Yu, Double Clad YAG Crystalline Fiber Waveguides for Diode Pumped High Power Lasing, Proc. of SPIE vol. 8959 895906-1 to 895906-9, 2014 (10 pages).

Nazila Soleimani, Bennett Ponting, Eminet Gebremichael, Antoine Ribuot, Gisele Maxwell, Coilable Single Crystals Fibers of Doped-YAG for High Power Laser Applications; Proc. of SPIE vol. 8959 895903-1 to 895903-10, 2014, (10 pages).

Xiaodong Mu, Helmuth Meissner, Huai-Chuan Lee, Mark Dubinskii, True Crystalline Fibers: Double-Clad LMA Design Concept of Tm: YAG-Core Fiber and Mode Simulation, Proc. of SPIE vol. 8237 82373M-1 to 82373M-5, 2012, (6 pages).

* cited by examiner

OPTICAL WAVEGUIDE

The invention relates to an optical waveguide with at least one core region extending along the longitudinal extent of the optical waveguide, and with a first jacket which, viewed in the cross section of the optical waveguide, surrounds the core region. The invention further relates to an optical arrangement with such an optical waveguide, and to a method for producing the optical waveguide.

Optical waveguides (also designated as "optical fibers") are known in various configurations from the prior art. Optical waveguides are lines for the transmission of light. The known optical waveguides are dielectric waveguides which are made up of concentric layers. Lying at the center is a light-guiding core, which is surrounded by a jacket that has a lower refractive index compared to the core. In commercial optical waveguides, protective layers of plastic are also provided which surround the jacket. Depending on the particular use, the core has a diameter ranging from a few micrometers to over one millimeter. Optical waveguides are differentiated according to, among other things, the number of propagation modes of the electromagnetic radiation of the light, which is limited by the core diameter (single-mode/multi-mode fibers).

The further development of fiber lasers in recent times has led to optical waveguides, as an active medium, providing a reliable concept for high-performance lasers. The development from low-energy lasers to high-performance lasers for industrial uses is based on the ability of optical waveguides to handle high output. The very good ratio of surface to active volume allows heat to be dissipated efficiently. This is an excellent basis for high-performance operation. However, conditions in the optical waveguide lead to other problems. For example, the limitation of the light signal to the core of the optical waveguide leads to high light intensity and to interactions between the material of the optical waveguide and the light signal. This results in particular in non-linear effects that are also difficult to control. The signal quality is thus seriously impaired.

Accordingly, optical waveguides should be designed in such a way that non-linear effects and interactions with the fiber material are reduced. The simplest and most effective way is for non-linear effects to be reduced by increasing the diameter of the core. On the one hand, the strength of the light in the core is thereby reduced and, on the other hand, the absorption of pump light can be increased, for example in double-jacketed optical waveguides. On account of the improved absorption of the pump light, the optical waveguide can be shortened and, in this way, non-linear effects can be further reduced.

However, in the case of a large core diameter of the optical waveguide, it is difficult to implement a single-mode operation or even an operation with only a few modes, particularly in high-performance operation. For this purpose, additional measures have to be taken, especially if there is a high thermal load.

However, it has been found that the previously known measures for the optimization of optical waveguides for high-performance operation cannot reliably prevent the occurrence of mode instability at high outputs. The output signal of the optical waveguide, or of a fiber laser produced with the latter, becomes unstable as soon as a defined performance threshold is exceeded. Energy is transferred from a base mode to higher-order modes. For example, the originally stable Gaussian beam profile of the radiation propagating in the optical waveguide begins to change, and the beam profile fluctuates over time as a consequence of a time-variable superposition of the base mode with one or more higher-order modes. The time behavior of these fluctuations can be deterministic or, depending on the power of the propagating radiation, it can also be random or chaotic. It is known that the mode instability is based on spatial temperature variations within the optical waveguide resulting from the mode interference. This causes a spatially and temporally variable radiation absorption in the material of the optical waveguide. On account of thermo-optical effects, this acts directly on the guiding of the light. The spatial temperature profile of the optical waveguide, arising from the mode interference, results in a lattice structure of the refractive index profile, which favors an energy transfer between the various modes of the propagating radiation.

Against this background, it is an object of the invention to make available an optical waveguide which is provided for high-performance operation and which, in respect of mode instability, is improved in relation to the prior art.

Proceeding from an optical waveguide of the type mentioned in the introduction, the invention achieves this object by virtue of the fact that the optical waveguide consists of crystalline material at least in the core region.

The invention is based on the approach of avoiding the occurrence of mode instability, or of shifting the performance threshold at which mode instability sets in toward higher values, by means of using a material which has improved thermal and thermo-optical properties compared to the prior art for the guidance of light in the optical waveguide. Crystalline materials such as yttrium aluminum garnet, sapphire or diamond are known for their excellent thermal properties, which are better, by at least one order, than the properties of quartz glass from which most conventional optical waveguides are made. Solely by virtue of the use, according to the invention, of crystalline material in the core region of the optical waveguide, the threshold at which mode instability sets in is significantly raised. Accordingly, the average output power of a laser that works with an optical waveguide according to the invention as active medium can be considerably increased in relation to the prior art.

Crystalline materials, in particular yttrium aluminum garnet, are known as active media in solid-state lasers from the prior art. With Nd:YAG or Yb:YAG lasers, it is possible to generate laser radiation with a power of over 1000 W. Even higher outputs can already be generated nowadays with according to the invention known fiber lasers. However, this merely confirms the potential of fiber lasers if crystalline material is used in these in the light-guiding regions, since the known fiber laser concepts provide conventional optical waveguides on the basis of quartz glass, which are much inferior to the known crystalline materials in terms of the thermal and thermo-optical properties, as has been stated.

In one possible embodiment of the optical waveguide according to the invention, it has a lower refractive index in the region forming the first jacket than it does in the core region. This corresponds to the conventional design of optical waveguides.

Alternatively, the core region can be formed by a plurality of channels which extend along the longitudinal extent of the optical waveguide and which, viewed in the cross section of the optical waveguide, are arranged around the core region, wherein the optical waveguide, in the regions forming the channels, has a lower refractive index as compared to the respective core region. In this embodiment, the channels surrounding the core region provide for guiding the light in the core region.

For the use of the optical waveguide according to the invention as an optical amplifier, for example in a fiber laser, the optical waveguide, viewed in cross section, should have at least one region which is doped with rare earth ions and which preferably at least partially overlaps the core region. In combination with a suitable pump light, which is propagated alongside the actual useful radiation in the optical waveguide, the doping provides for stimulated emission and therefore amplification of the useful radiation.

In a further preferred embodiment of the optical waveguide according to the invention, a second jacket is provided which, viewed in the cross section of the optical waveguide, surrounds the first jacket, wherein the optical waveguide has a lower refractive index in the region forming the second jacket than it does in the region of the first jacket. A double-jacketed structure is obtained in this way. The second jacket optically shields the arrangement of core and first jacket from the environment. The first jacket can serve for the propagation of pump light in the optical waveguide. The different refractive indices of the first jacket and second jacket have the effect of guiding the pump light in the optical waveguide.

In a particularly preferred embodiment, the optical waveguide consists of crystalline material not only in the core region but also in the region of the first and/or second jacket, in order to likewise optimize their thermal and thermo-optical properties. Alternatively, the first and/or the second jacket can consist of ceramic material or also of glass, for example quartz glass.

The core region and the first and/or second jacket of the optical waveguide according to the invention preferably each have a rectangular or square cross section, wherein the edge lengths are smaller than the length of the optical waveguide. The length of the optical waveguide should be at least ten times the Rayleigh length of the light propagating in the optical waveguide. Conventional optical waveguides typically have a circular or elliptic cross section. However, this is mainly a result of the production process that is used for conventional optical waveguides. The round shape is not an optical requirement. Optical waveguides according to the invention with a crystalline core and, if appropriate, also with a crystalline jacket can be better produced with a rectangular cross section, as is explained further below. This has no disadvantage as regards the guiding of the light. Indeed, the rectangular shape even has advantages as regards heat dissipation, particularly in the case of optical waveguides having a plurality of cores, as will be discussed further below.

A particularly promising concept for raising the threshold of mode instability is the use of multi-core optical waveguides, that is to say optical waveguides that have a plurality of independent and active, i.e. suitably doped, core regions alongside each other. It has been found that the output threshold at which mode instability sets in scales approximately with the number of the cores in a multi-core optical waveguide. The underlying concept is that the light beam to be amplified is split up into partial beams before being coupled into the optical waveguide, wherein each of the core regions of the multi-core optical waveguide guides a respective partial beam. After passing through the optical waveguide, the partial beams are superposed again in a single output beam. According to the invention, provision can therefore be made that the optical waveguide has a plurality of core regions which, viewed in the cross section of the optical waveguide, are spaced apart from one another and arranged alongside and/or over one another. In this way, a multi-core crystalline optical waveguide is obtained in which the attainable output rate is increased still further compared to the prior art. The arrangement of a plurality of cores in a common optical waveguide structure has the advantage that all the core regions that guide light are exposed to identical environmental influences (for example identical temperature variations). This means that no significant relative variations of the optical path lengths of the partial beams occur in the optical waveguide, which would interfere with the combining of the partial beams in the output beam.

In a preferred embodiment of the multi-core optical waveguide according to the invention, the core regions are surrounded by a common first jacket; each core region can likewise be surrounded by a first jacket assigned only to this core region, in order to better shield the individual cores from each other.

In a further preferred embodiment of the optical waveguide according to the invention, an insulation region is provided which, viewed in the cross section of the optical waveguide, is arranged between at least two core regions, wherein the optical waveguide has, in the insulation region, a reduced thermal conductivity in relation to the other regions. In this way, the occurrence of a thermal interaction between the different core regions of the multi-core optical waveguide is prevented. A corresponding interaction is at least reduced. Such a thermal interaction could in turn lead to a lowering of the output threshold at which mode instability sets in. To avoid the core regions thermally influencing each other, they can be arranged in a geometrically optimized manner, in the matrix of the optical waveguide forming the first jacket, in order to minimize thermal interactions or in order to achieve a thermal interaction between the core regions that is mutually as symmetrical as possible.

The invention further relates to an optical arrangement with
- a splitting element, which splits an input beam into at least two partial beams,
- at least one multi-core optical waveguide according to the invention through which the partial beams propagate, wherein each core region guides a respective partial beam, and
- at least one combining element which spatially superposes the partial beams in one output beam.

Particularly preferably, the splitting element and/or the combining element each have a partially reflective element which reflects the radiation of the input beam or output beam, respectively, two or more times, wherein the partially reflective element has zones of different reflectivity.

The input beam is split into a plurality of partial beams, such that a plurality of ideally independent channels are used for the propagating radiation. In the optical arrangement, the optical waveguide according to the invention functions as a multi-channel element through which the partial beams propagate spatially separately from each other. For optical amplification, the pump radiation can be guided in the optical waveguide in a plurality of separate jacket regions as pump channels or in a common jacket region as pump channel.

The optical arrangement according to the invention has a compact and angle-dispersion-free splitting and combining element for the splitting and combining, respectively, of the radiation. The splitting element and the combining element are preferably of identical design, such that the splitting and the combining of the radiation take place symmetrically.

According to the invention, the splitting element and/or the combining element each have a partially reflective element which reflects the radiation of the input beam or of the output beam two or more times, wherein the partially reflective element has zones of different reflectivity. The radiation of the input beam or of the output beam is, in other words, reflected successively at the various zones of the partially reflective element, i.e. with another reflectivity in each partial reflection process. For example, the reflectivity of the zones of the partially reflective element along a direction lying in the reflection plane of the radiation is lesser or greater depending on whether it is the splitting element or the combining element. The different (decreasing or increasing) reflectivity has the effect that, for example in the splitting element, each partial beam, which is generated as a non-reflected fraction of the input beam in one of the successive partial reflection processes, has a defined, preferably constant intensity.

Moreover, the splitting element and/or the combining element expediently have in each case a reflective element, wherein the radiation is then reflected back and forth several times between partially reflective element and reflective element. The surface of the reflective element can be plane-parallel to the surface of the partially reflective element. The radiation expediently impinges the partially reflective element obliquely, i.e. at an angle different than 90°, such that the partial beams, after splitting, propagate in a common plane in parallel and at an equidistant interval. The angle of incidence is to be chosen such that the radiation is partially reflected successively at the zones of different reflectivity.

The optical waveguide according to the invention can be produced in different ways.

A possible production method has the following method steps:
    introduction of at least one depression into a first substrate piece,
    epitaxial growth of a crystalline material, forming the core region, on the first substrate piece,
    removal of the crystalline material from the surface of the first substrate piece, such that the crystalline material remains only in the region of the depression, and
    application of a second substrate piece to the surface of the first substrate piece, and connection of the two substrate pieces such that they together form the first jacket.

In this production method, the substrate used is the material of the optical waveguide that forms the first jacket in the finished optical waveguide. A depression is first introduced into the substrate in the direction of the longitudinal extent of the optical waveguide, for example by chemical etching. To produce a multi-core optical waveguide, a plurality of depressions are introduced alongside one another into the first substrate piece. The depression is then filled with the doped material which forms the core region in the finished optical waveguide. To generate the crystalline core, the material is grown epitaxially on the first substrate piece. In the next step, the crystalline material is then removed again from the surface of the first substrate piece, for example by grinding or polishing, such that the crystalline material of the core remains only in the area of the depression or of the depressions. A second substrate piece, which together with the first substrate piece forms the first jacket of the optical waveguide, is then applied to the first substrate piece and connected thereto, with or without a suitable adhesive. If appropriate, the optical waveguide thus generated can be covered on its outer surfaces with further material, which forms the second jacket of the optical waveguide.

In an alternative production method, a layered stack of a crystalline matrix material (for example yttrium aluminum garnet) is generated, wherein undoped material and material doped with rare earth ions are arranged alternately in the layered stack. This layered stack is then cut transversely with respect to the layers. The cut surfaces are finally covered with undoped crystalline material. The undoped crystalline material forms the first jacket of the optical waveguide. To connect the layers to one another, an adhesive-free connecting piece can be used. Alternatively, optical adhesives with a refractive index suitably adapted to the crystalline material can be used. Further material, which forms the second jacket of the optical waveguide, can be applied to the outer surfaces.

Illustrative embodiments of the invention are explained in more detail below with reference to the drawings, in which.

Figure 1:
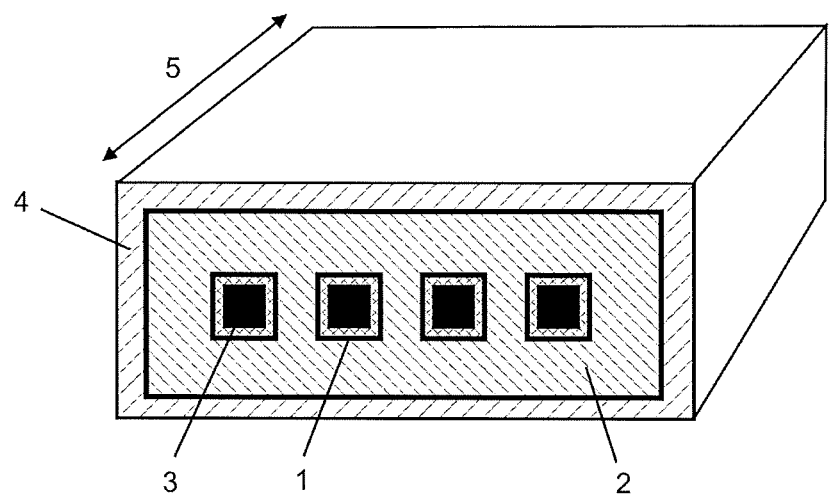
FIG. 1 shows a sectional plan view of an optical waveguide according to the invention with a plurality of cores arranged alongside one another.

FIG. 1 shows an optical waveguide according to the invention in a sectional plan view. Viewed in the cross section, the optical waveguide has four different regions consisting of different materials with different optical properties. Each of the regions extends along the entire longitudinal extent of the optical waveguide.

The optical waveguide shown in FIG. 1 has four core regions 1 arranged alongside one another. The core regions 1 are surrounded by a common first jacket 2, which has a lower refractive index than the core regions 1. At their center, the core regions 1 each have a region 3 doped with rare earth ions. A second jacket 4, which for its part has a lower refractive index than the first jacket 2, surrounds the arrangement of cores 1 and first jacket 2 and optically shields these from the outside. The length 5 of the optical waveguide is many times greater than the edge lengths of the square or rectangular core regions 1 and jacket regions 2 and 4. The length 5 of the optical waveguide is at least ten times the Rayleigh length of the light propagating in the optical waveguide. According to the invention, the core regions 1 consist of crystalline material, for example yttrium aluminum garnet. The jacket regions 2 and 4 also preferably consist of crystalline material. However, this is not a requirement. The jacket regions 2 and 4 can likewise consist of ceramic material or of glass. The second jacket 4 is optional. The optical waveguide can alternatively have an air jacket.

Figure 2:
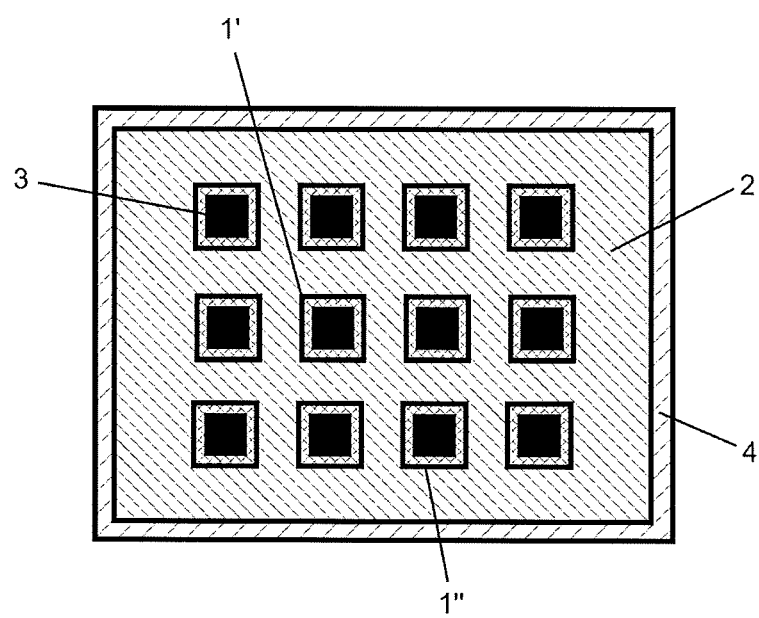
FIG. 2 shows a cross-sectional view of an optical waveguide according to the invention with cores arranged alongside and over one another.

While FIG. 1 shows a multi-core optical waveguide with a one-dimensional arrangement of the cores 1, FIG. 2 shows a multi-core optical waveguide according to the invention with, viewed in the cross section of the optical waveguide, a two-dimensional arrangement of the cores, in which arrangement the core regions are spaced apart from one another and arranged alongside and over one another.

In the illustrative embodiments shown in FIGS. 1 and 2, no special measures are taken to thermally shield the core regions 1 from one another. The regions of thermal influence of the cores 1 extend well beyond the doped regions 3, such that thermal coupling between the various core regions 1 cannot be ruled out. The thermal coupling can be influenced in a specific way by the arrangement of the core regions 1 over the cross section of the optical waveguide. For example, in the arrangement in FIG. 2, the two central core regions 1' are each surrounded by eight other cores. The core regions 1" arranged at the periphery are each surrounded by three or five other cores. This means that the chance of thermal interaction between the core regions 1', 1" is greater in the central core regions 1' than in the peripheral core regions 1".

Figure 3:
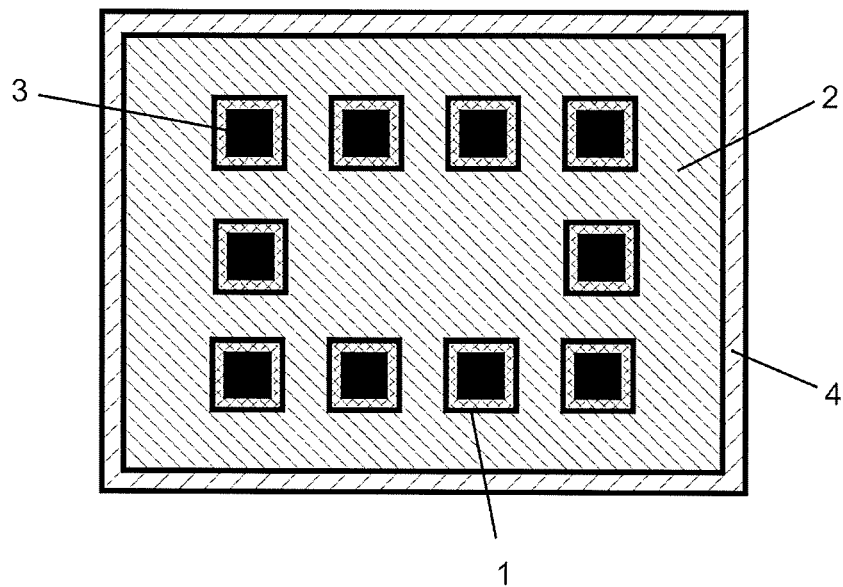
FIG. 3 shows a cross-sectional view of an optical waveguide according to the invention with an optimized arrangement of the core regions.

FIG. 3 shows a modified arrangement in which each core region 1 is surrounded by two further core regions, such that all the core regions 1 have a similar thermal interaction with the other cores. In this way, the performance of the optical waveguide can be improved. In particular, the threshold at which mode instability sets in can be raised further.

In the illustrative embodiments in FIGS. 1-3, all the core regions 1 are surrounded by a common first jacket region 2. In the illustrative embodiment shown in FIG. 4, each core region 1 is surrounded by a first jacket 2' assigned only to this core region, in order to better shield the individual channels of the multi-core optical waveguide from one another. The two first jacket regions 2' are surrounded by a common second jacket region 4. Moreover, in the illustrative embodiment shown in FIG. 4, the doped region 3 lies slightly outside the core region 1. The arrangement of the doped region 3 relative to the light-guiding core region 1 and, if appropriate, the overlap of the doped region 3 with the core region 1 can be specifically chosen to promote or suppress the strengthening of individual modes of the light propagating in the optical waveguide.

Figure 4:
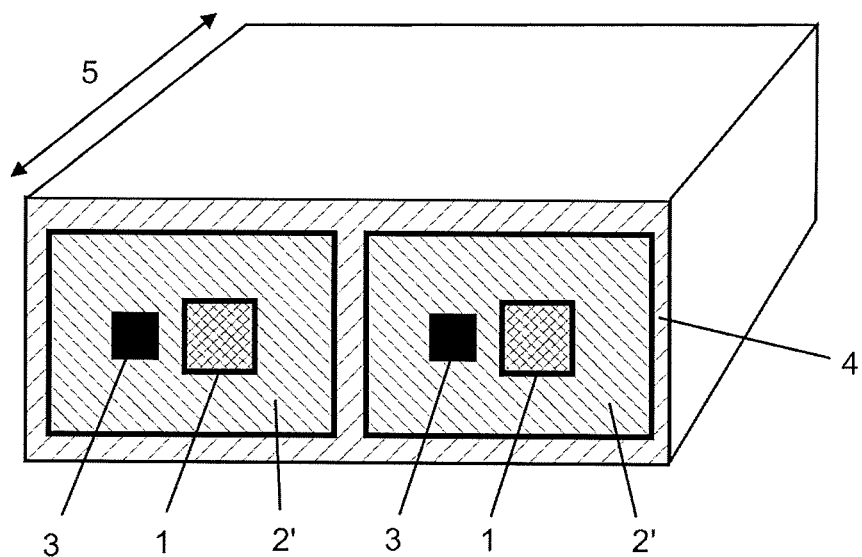
FIG. 4 shows a sectional plan view of an optical waveguide according to the invention with doping arranged outside the cores.
Figure 5:
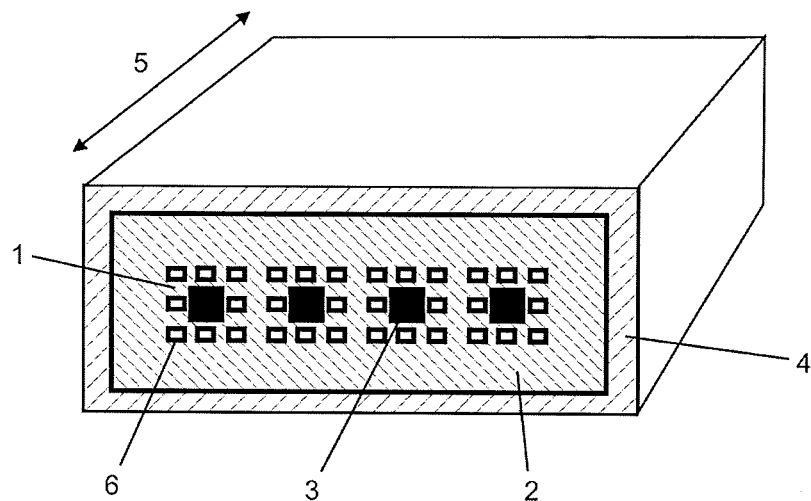
FIG. 5 shows a sectional plan view of an optical waveguide according to the invention with core regions delimited by channels.

In the illustrative embodiment shown in FIG. 5, the core regions 1 are formed by a plurality of channels 6 which extend along the longitudinal extent of the optical waveguide and which, viewed in the cross section of the optical waveguide as shown, are arranged around each core region 1, wherein the optical waveguide, in the regions forming the channels 6, has a lower refractive index in relation to the respective core region 1 or the jacket 2. Within the regions delimited by the channels 6, the optical waveguide has substantially the same refractive index as in the region of the first jacket 2. The channels 6 guide the light in the core regions 1. The channels 6 can be arranged specifically to influence the guiding of the light and to permit the localization of a Gaussian base mode in the core region and a simultaneous delocalization of higher-order modes, so that their propagation in the optical waveguide is suppressed as far as possible. By this strategy, the performance threshold at which mode instability sets in can be raised further. The channels 6 can consist of crystalline or non-crystalline material, with crystalline material also being preferred here. It is possible to produce the channels 6 from material of low thermal conductivity (for example air), such that the channels 6 at the same time serve as a thermal and optical barrier between the core regions 1. In the embodiment with channels 6 for forming the core regions 1, as shown in FIG. 5, it is also possible, instead of the common first jacket 2, that each core region 1 is assigned just one first jacket 2', similarly to what is shown in FIG. 4.

Figure 6:
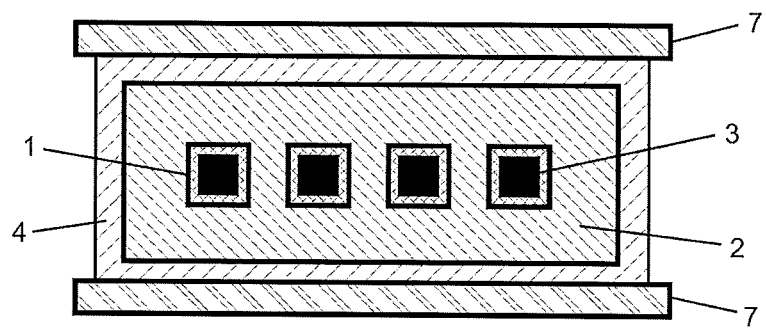
FIG. 6 shows a cross-sectional view of an optical waveguide according to the invention with cooling elements.

In all of the illustrative embodiments shown in the figures, the optical waveguide has, as has been mentioned, a rectangular cross section. This geometry is advantageous in terms of the production of the optical waveguide from crystalline materials. The rectangular cross section has further advantages, as can be seen from FIG. 6, for example. The optical waveguide shown is designed in the manner shown in FIG. 1. For heat dissipation, plate-shaped cooling elements 7 are arranged on the upper and lower surfaces of the optical waveguide. On account of the flat shape of the optical waveguide, the heat arising in the doped core regions 1 during optical amplification can be dissipated particularly effectively. With regard to avoiding mode instability, it is advantageous that all the core regions 1 are at the same distance from the cooling elements 7, thereby providing for uniform cooling.

Figure 7:
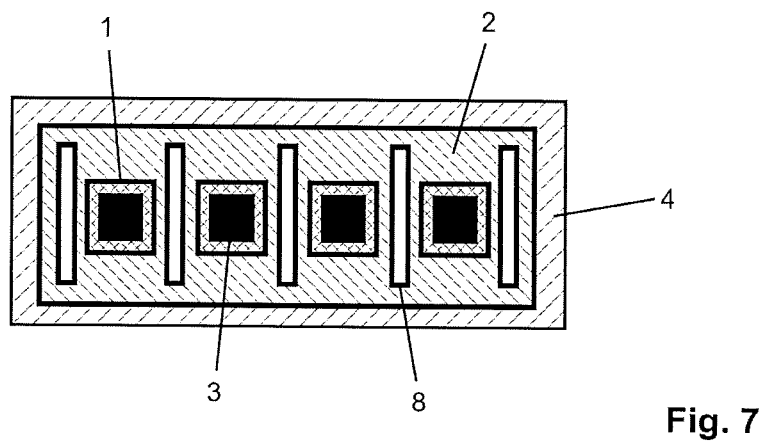
FIG. 7 shows a cross-sectional view of an optical waveguide according to the invention with thermal insulation regions between the core regions.

In the illustrative embodiment shown in FIG. 7, insulation regions 8 are arranged between the core regions 1, wherein the optical waveguide has, in the insulation regions 8, a reduced thermal conductivity compared to the other regions. The insulation regions serve to avoid thermal coupling between the core regions 1, in order to avoid mode instability. The insulation regions can consist of air or of other suitable materials.

Figure 8:
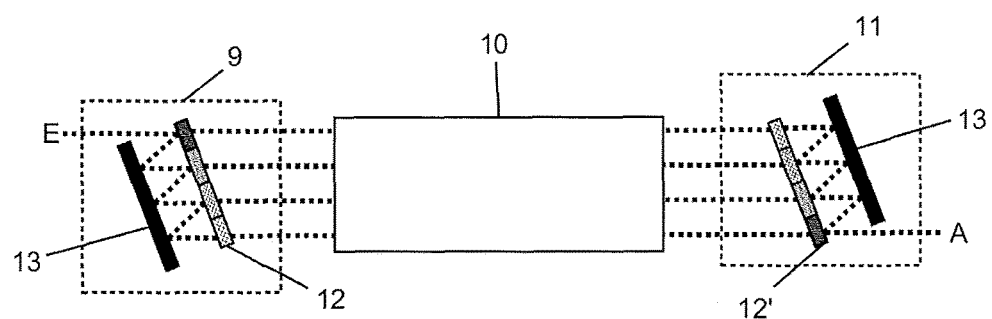
FIG. 8 shows a schematic view of an optical arrangement with an optical waveguide according to the invention.

The optical arrangement shown in FIG. 8 has a splitting element 9 which splits an input beam E into several spatially separate partial beams. These partial beams propagate through an optical waveguide 10 according to the invention, which is accordingly designed as a multi-core optical waveguide as shown in FIGS. 1 to 7. Each core region 1 of the optical waveguide guides a respective partial beam. Moreover, a combining element 11 is provided which spatially superposes the partial beams in an output beam A. The splitting element 9 comprises two elements, namely a partially reflective element 12 and a reflective element 13. The reflective element 13 is a mirror with the highest possible reflectivity. The partially reflective element 12 reflects a part of the incident radiation E (e.g. from a pulsed laser). The non-reflected part is transmitted and generates a partial beam. The partially reflective element 12 consists of N (N=4 in the illustrative embodiment shown) zones with different reflectivity. The input beam E is reflected back and forth several times between the partially reflective element 12 and the plane-parallel reflective element 13 lying opposite and at a distance from the element 12. The degrees of reflectivity of the zones of the partially reflective element 12 are chosen such that the incident input beam E is divided in a defined ratio into the N partial beams. The generated partial beams are parallel and equidistant here. The combining element 11 has an identical structure with partially reflective element 12' and reflective element 13'. The combining element 11 superposes the partial beams in an output beam A. It is in this case arranged antisymmetrically with respect to the splitting element 1 in such a way that the resulting differences in path length of the N partial beams cancel each other out exactly. On account of the integration of the 1:N split or combination in a respective individual element 9 or 11, a compact design is possible and simple adjustment is ensured.

The invention claimed is:

1. An optical waveguide system, said optical waveguide system comprising:
   a splitting element, which splits an input beam (E) into at least two spatially separate partial beams, at least one optical waveguide with at least two core regions through which the partial beams propagate, wherein each core region guides a respective partial beam, and at least one combining element that spatially superposes the partial beams in one output beam (A);

wherein said at least two core regions, when viewed in a cross section of the optical waveguide, are spaced apart from one another and arranged at least alongside and over one another; and wherein at least one core region extends along a longitudinal extent of the optical waveguide, and with a first jacket which, when viewed in the cross section of the optical waveguide, surrounds the core region, wherein the optical waveguide further comprises a crystalline material at least in the core region.

2. The optical waveguide system of claim 1, wherein the optical waveguide has a lower refractive index in the region forming the first jacket than it does in the core region.

3. The optical waveguide system of claim 1, wherein the core region is formed by a plurality of channels which extend along the longitudinal extent of the optical waveguide and which, viewed in the cross section of the optical waveguide, are arranged around the core region, wherein the optical waveguide, in the regions forming the channels, has a refractive index that is lower compared to the core region.

4. The optical waveguide system of claim 1, wherein the crystalline material is comprises one or more of a yttrium aluminum garnet, a sapphire and a diamond.

5. The optical waveguide system of claim 1, wherein the optical waveguide, when viewed in cross section, has at least one region that is doped with rare earth ions and at least partially overlaps the core region.

6. The optical waveguide system of claim 1, further comprising a second jacket which, viewed in the cross section of the optical waveguide, surrounds the first jacket, wherein the optical waveguide, in the region forming the second jacket, has a refractive index that is lower than in the region of the first jacket.

7. The optical waveguide system of claim 1, wherein the optical waveguide, in the region of at least one of the first and second jacket, comprises at least one of a crystalline or ceramic material or of a glass.

8. The optical waveguide system of claim 1, wherein the core region and at least one of the first and the second jacket each have a rectangular or square cross section.

9. The optical waveguide system of claim 8, wherein the optical waveguide as a whole has a rectangular or square cross section.

10. The optical waveguide system of claim 1, wherein the core regions are surrounded by a common first jacket.

11. The optical waveguide system of claim 1, wherein each core region is surrounded by a first jacket assigned only to this core region.

12. The optical waveguide system of claim 1, further comprising an insulation region which, when viewed in the cross section of the optical waveguide, is arranged between at least two core regions, wherein the optical waveguide has a reduced thermal conductivity in the insulation region compared to the other regions.

13. The optical waveguide system of claim 1, further comprising at least one cooling element bearing on the surface of the first or second jacket.

14. The optical waveguide system of claim 1, wherein the length of the optical waveguide amounts to at least ten times the Rayleigh length of the light propagating in the optical waveguide.

15. The optical waveguide system of claim 1, wherein at least one of the splitting element and the combining element each have a partially reflective element which reflects the radiation of the input beam (E) or output beam (A), respectively, two or more times, wherein the partially reflective element further comprises zones of different reflectivity.

* * * * *